United States Patent [19]

Calhoun et al.

[11] 4,285,503
[45] Aug. 25, 1981

[54] APPARATUS FOR STEAM GENERATOR TUBE WRAPPER SPACER AND SUPPORT BLOCK REMOVAL

[75] Inventors: Gregory L. Calhoun, Lutz, Fla.; Angelo Cassette, Greensburg, Pa.

[73] Assignee: Westinghouse Electric Corp., Pittsburgh, Pa.

[21] Appl. No.: 59,857

[22] Filed: Jul. 20, 1979

Related U.S. Application Data

[63] Continuation of Ser. No. 974,160, Dec. 28, 1978, abandoned.

[51] Int. Cl.³ .............................................. B23K 7/10
[52] U.S. Cl. .................................... 266/71; 29/157.4; 266/72; 266/77
[58] Field of Search ................. 266/71, 72, 77, 67, 266/68, 73; 29/157.4

[56] References Cited

U.S. PATENT DOCUMENTS

| | | | |
|---|---|---|---|
| 2,734,737 | 2/1956 | Scardince | 266/77 |
| 3,058,733 | 10/1962 | Steventon et al. | 148/9 R |
| 3,069,298 | 12/1962 | Stellmacher | 266/50 |
| 3,153,109 | 10/1964 | Steventon et al. | 148/9 R |
| 3,174,736 | 3/1965 | Cameron | 266/66 |
| 3,339,903 | 9/1967 | Reinfeld et al. | 148/9 R |
| 3,783,036 | 1/1974 | Ulrichsen | 148/9 R |
| 3,845,942 | 11/1974 | Roeder | 266/59 |
| 4,003,556 | 1/1977 | Roeder | 266/48 |
| 4,018,629 | 4/1977 | Dickey et al. | 148/9 |

*Primary Examiner*—L. Dewayne Rutledge
*Assistant Examiner*—John P. Sheehan
*Attorney, Agent, or Firm*—Daniel C. Abeles

[57] ABSTRACT

A spacer and block cutting torch is lowered through the wrapper-to-shell annulus of a removed-top steam generator by addition of vertical sections of hollow-back column by vertical movement of a motorized carriage along a rack-and-guide track extending upwardly from atop the wrapper and manipulation of column clamps, one movable with the carriage and the other affixed to the wrapper, to transfer column weight from carriage to wrapper-top during adding and subtracting column sections. The rearward concave side of the column, held flush with the wrapper wall, readily accepts and serves to enclose operating gas hoses for the cutting torch. Yieldable bias means cooperates with the interior of the generator shell to urge the concave side of the column toward the wrapper.

8 Claims, 17 Drawing Figures

APPARATUS FOR STEAM GENERATOR TUBE WRAPPER SPACER AND SUPPORT BLOCK REMOVAL

This is a continuation of application Ser. No. 974,160, filed Dec. 28, 1978, now abandoned.

CROSS-REFERENCE TO RELATED APPLICATIONS

This application is also related to U.S. Application Ser. No. 834,855 filed Sept. 19, 1977 to R. A. Blanco and A. A. Massaro on a System and Method For Retubing A Steam Generator, now U.S. Pat. No. 4,192,053.

BACKGROUND OF THE INVENTION

This invention relates to a method and apparatus for steam generator tube wrapper spacer and support block removal, and more particularly to such method and apparatus used during retubing of a steam generator in a nuclear power plant.

Nuclear reactor power plants utilize a steam generator having a tube bundle to transfer heat from a primary side reactor-heated liquid to water on a secondary side to form steam for driving a turbine. Condenser leaks in power plant have caused circulating water, which is often brackish, to mix with the secondary-side water in the steam generator, resulting in the buildup of undesirable chemicals in the tube bundle. Water treatment and blowdown have not completely protected the steam generator tubes from corrosion and leaks. As the number of tubes subject to such leaks increases, the desirability of replacement or repair on the steam generator increases. Since removal of a steam generator in its entirety from a nuclear power plant requires removal of a large portion of a reinforced concrete containment vessel, such replacement of a generator in its entirety becomes time-consuming, expensive, and therefore undesirable.

SUMMARY OF THE INVENTION

The present invention is related in general to the replacement of the tube bundle in a steam generator in a nuclear power plant and more particularly to a method and apparatus for rapidly cutting through the spacers and the support blocks in the annulus between the outer shell of the generator and the cylindrical wrapper that encircles the tube bundle in such a generator. The present invention contemplates the use of a cutting torch in such annulus supported by a multi-section support column made up of a number of interlocked separable aluminum channel sections supported by way of an adjustable horizontal support arm assembly by a motorized carriage movable vertically along an upright rack-and-guide member clamped to and supported by the upper edge of the wrapper. The support column, by virture of being formed from channel sections of U-shape in cross section, forms an elongated vertical cavity on one side which accommodates disposition of the hoses for the cutting torch. By manipulation of an upper column clamp on the support arm assembly and a lower column clamp affixed to the top of the wrapper the motorized carriage can be made to raise and lower the column for addition and subtraction of channel sections as well as vertical traverse of the cutting torch past the workpieces.

DETAILED DESCRIPTION OF THE INVENTION

Figure 1:
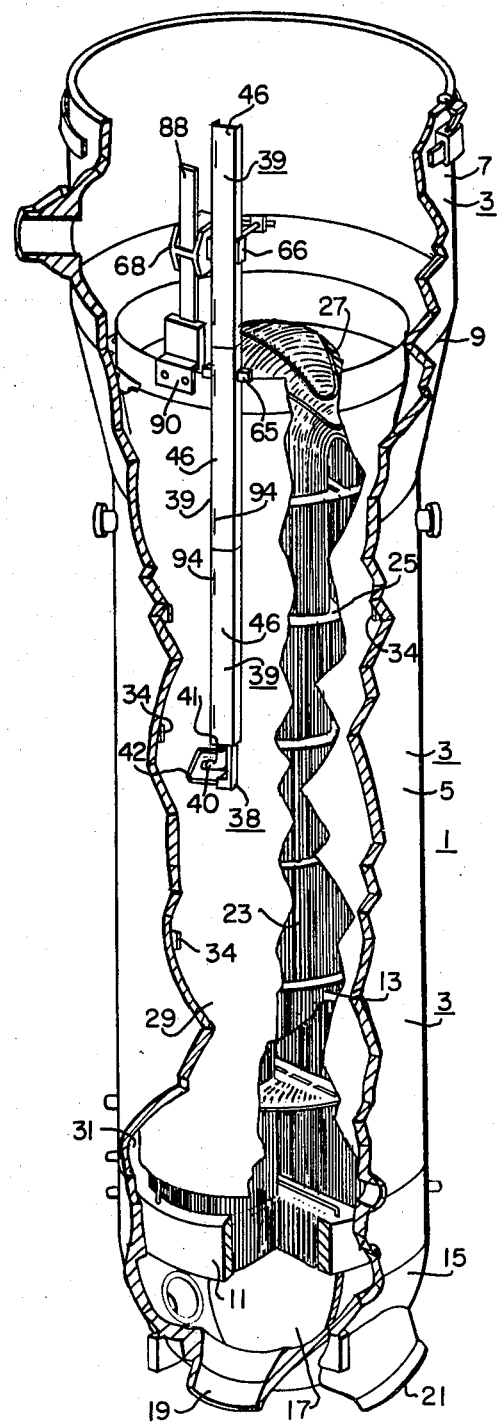
FIG. 1 is a vertical perspective view of the tube-bundle-containing portion of a nuclear power plant steam generator shown partially in section after removal of the top portion thereof and affiliation with the cutting apparatus of the present invention.

Referring to FIG. 1 in the drawings, the steam generator 1 with which the method and apparatus of the present invention are intended to be employed typically includes a vertically oriented shell 3, the shell comprising a lower cylindrical portion 5 and an upper cylindrical portion 7, larger in diameter than the lower portion 5, and a frusto-conical transition portion 9 joining the lower and upper portions 5 and 7. A tubesheet 11 is disposed in the lower end of the lower portion 5 of the shell 3 and has a plurality of holes for accommodating the ends of U-shaped tubes 13 which extend upwardly from the tubesheet 11 and are closely packed to form the tube bundle 23 disposed vertically within the lower portion 5 of the shell 3.

A hemispherically shaped channel head 15 is fastened to the tubesheet 11 and has a divider plate 17 disposed therein. A primary fluid inlet nozzle 19 supplies heated primary fluid from a nuclear reactor core (not shown) to one portion of the channel head 15 and a discharge nozzle 21 provides for return of the primary fluid to such reactor core.

A plurality of support plates 25 are disposed throughout the height of the tube bundle to support the tubes 13 at various locations along their length to reduce flow-induced vibrations. Anti-vibration bars 27 are also disposed adjacent to bends in the tubes 13 to prevent vibration in this portion of the tube bundle 23. A wrapper or sleeve 29 is disposed between the tube bundle 23 and the shell 3 so as to form an annulus or annular space 31 therebetween. As shown in FIG. 1, the upper part of the upper section 7 of the shell 3 has been removed to gain access to the interior of the steam generator in preparation for removal and replacement of the tube bundle 23 therein. Various components on the steam generator usually disposed in the upper section 7 also have been removed from the generator as shown in FIG. 1 to provide access to the top of the wrapper 29 and to the tube bundle 23 encircled thereby.

Figure 14:
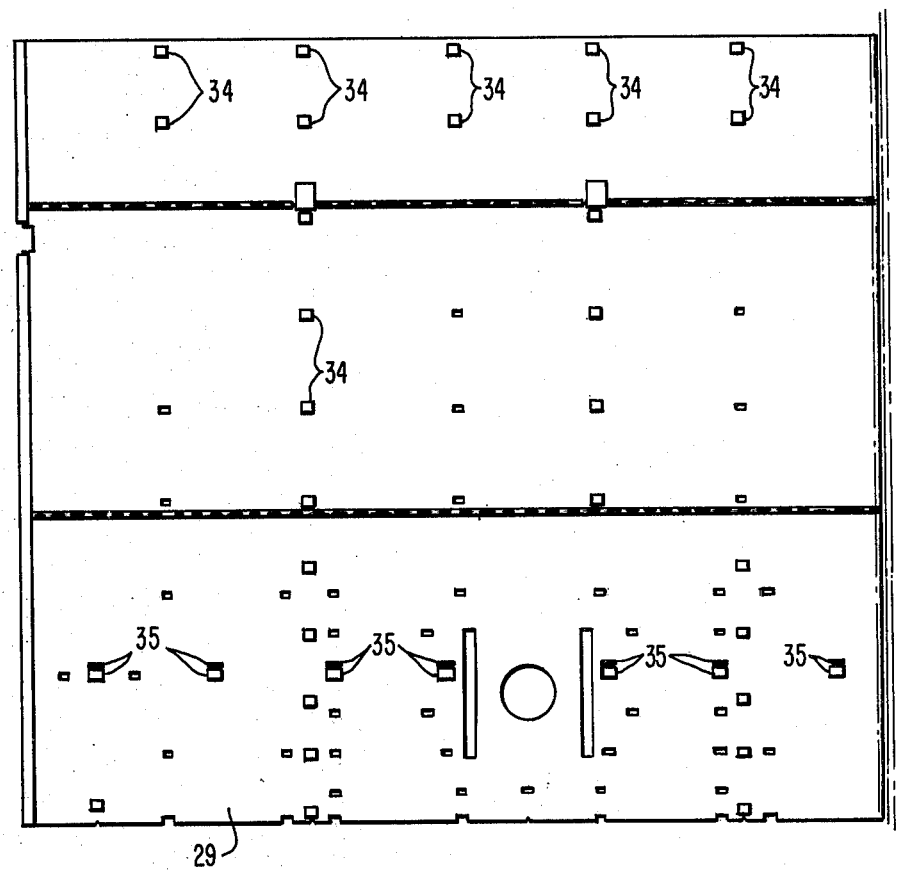
FIG. 14 is a developmental view of a wrapper of a nuclear steam generator showing typical locations and sizes and types of spacers and support blocks associated with such wrapper as installed inside the shell of such generator.

Involved in removal of the tube bundle 23 is the removal also of the wrapper 29 which, in turn, involves the separation or substantial removal of a plurality of channel-shaped spacer members 34, FIGS. 1 and 14, and pads or blocks 35 extending between the exterior of the wrapper 29 and the interior of the shell 3 in the annular space 31; the channel spacers 34 serving to maintain evenly distributed spacing around the periphery of the wrapper 29 and the pad or block assemblies 35 providing for support of the wrapper 29 by the shell 3. The primary function of the apparatus and method of the present invention is to cut through and thereby effectively remove the channel spacers 34 and the support pads or block assemblies 35 to free the wrapper 29 for removal.

Figure 9:
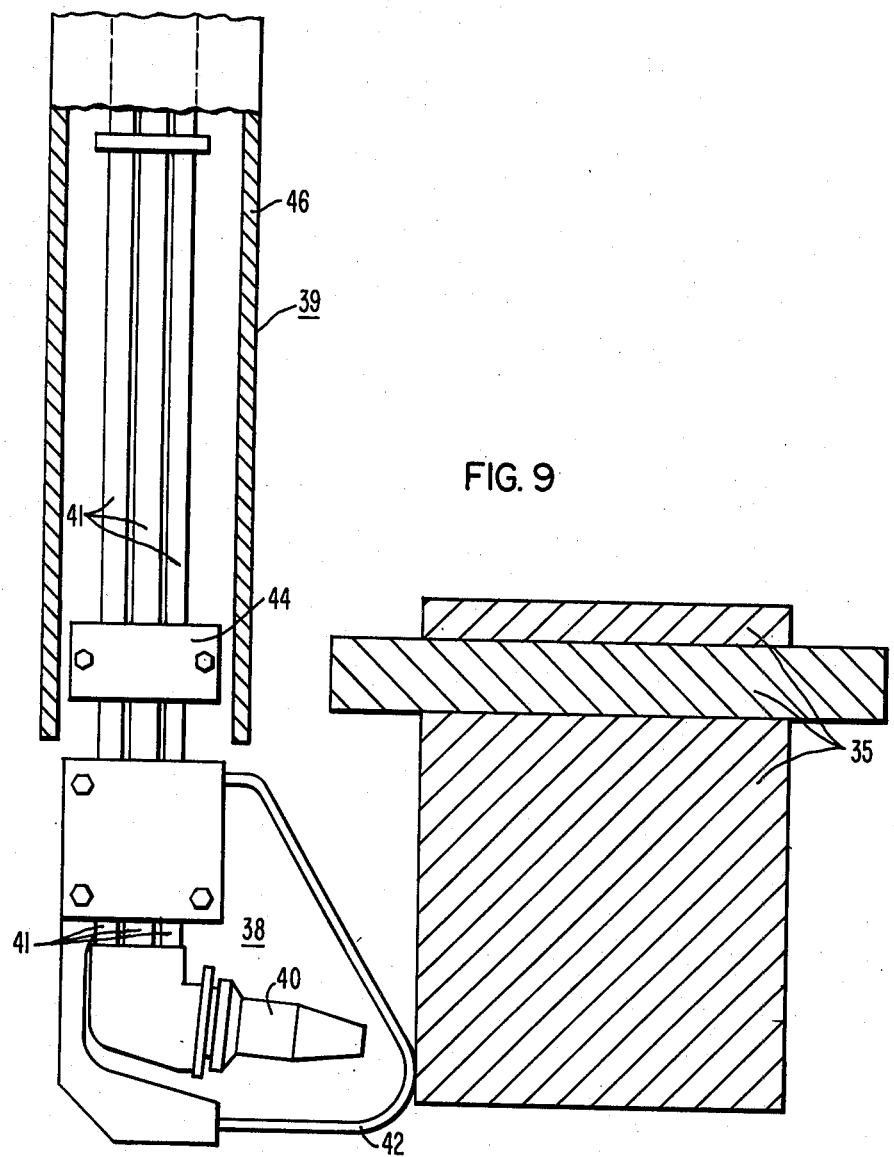
FIG. 9 is an elevation view, partly in outline and partly in section of the cutting torch region of the apparatus of the present invention shown in association with mounting block members disposed in the annulus between the wrapper and the shell of a nuclear steam generator.
Figure 8:
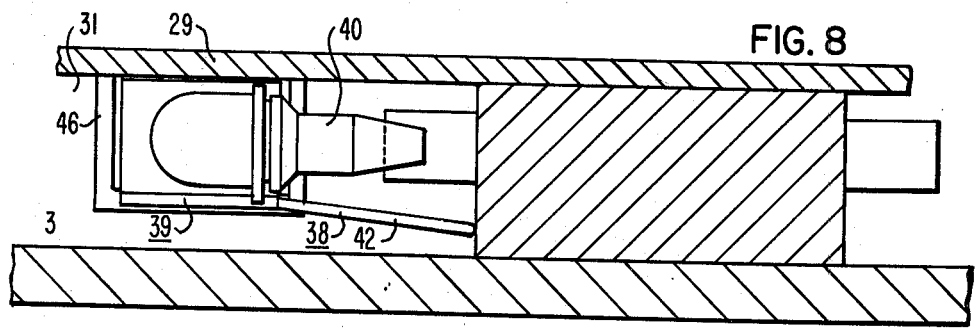
FIG. 8 is a bottom view showing a cutting torch embodied in the apparatus in the present invention in working position in affiliation with a mounting block member disposed between the wrapper and the shell of a nuclear steam generator.

Referring to FIGS. 1, 8 and 9, the cutting apparatus of the present invention includes a cutting torch assembly 38 carried on the lower end of a multisection vertical support column 39 extending downwardly in the annular clearanceway 31 between the outside of the wrapper 29 and the interior of the shell 3. Torch assembly 38 includes a nozzle 40 in receipt of operating gases such as oxygen and acetylene by way of downwardly extending supply tubes 41 to produce a cutting flame directed sidewardly toward the workpiece parts to be severed, such as the pads or block members 35 in FIGS. 8 and 9 and the channel members 34, etc. in FIGS. 1 and 14, for example. The torch assembly also includes a guard member 42 that extends forwardly from one side of the nozzle 40 for contact with workpiece members to maintain the nozzle at a proper distance away from such member. The member 42 is curved to facilitate sliding over irregularities in the workpiece parts such as exemplified in FIG. 9. Torch assembly 38 can be supported through the medium of the working gas supply tubes 41 and tube clamping means 44 affiliated with the column 39. The attitude of the torch nozzle 40 is such that the cutting flame generated by such nozzle is directed substantially parallel to and adjacent to the outer wall of the wrapper 29 and tends to be kept away from the inner wall of the shell 3 of the steam generator.

Figure 2:
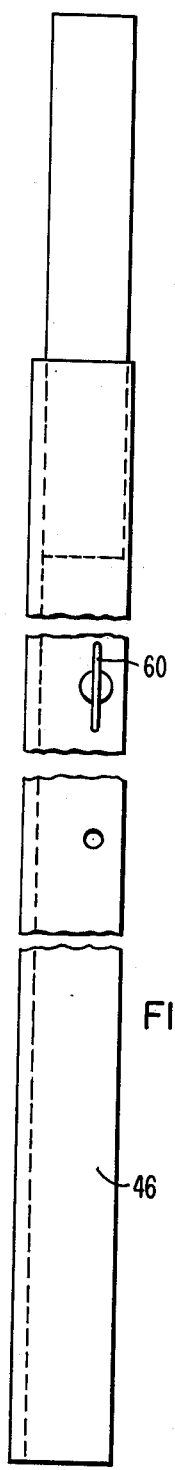
FIG. 2 is a side elevation outline view of the torch support column embodied in the apparatus of the present invention.
Figure 3:
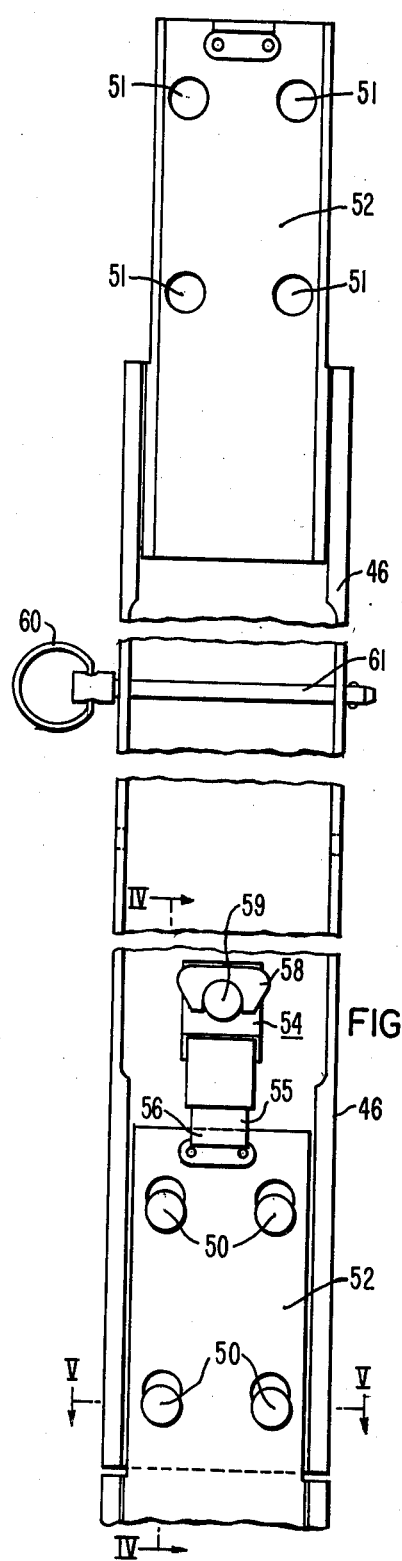
FIG. 3 is a rear elevation outline view of the column of FIG. 2 showing details of channel junction regions thereof.
Figure 4:
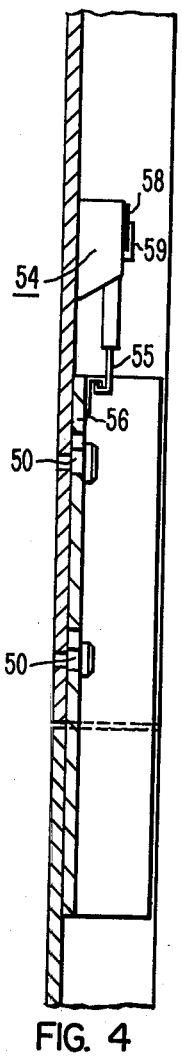
FIG. 4 is a side elevation section view taken along the line IV—IV in FIG. 3.
Figure 5:
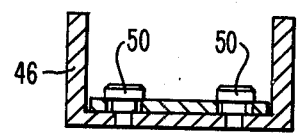
FIG. 5 is a transverse section view of the column of FIGS. 2, 3 and 4 taken along the line of V—V in FIG. 3.
Figure 7:
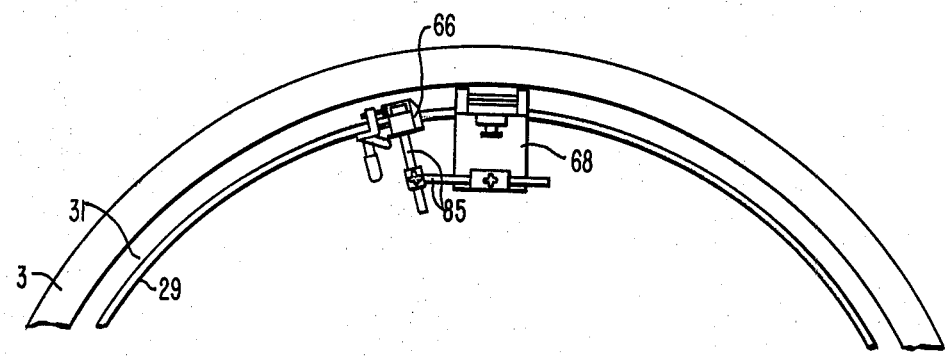
FIG. 7 is a fragmental plan view showing the cutting apparatus of the present invention installed on the upper edge of the wrapper of the steam generator of a nuclear power plant.
Figure 6:
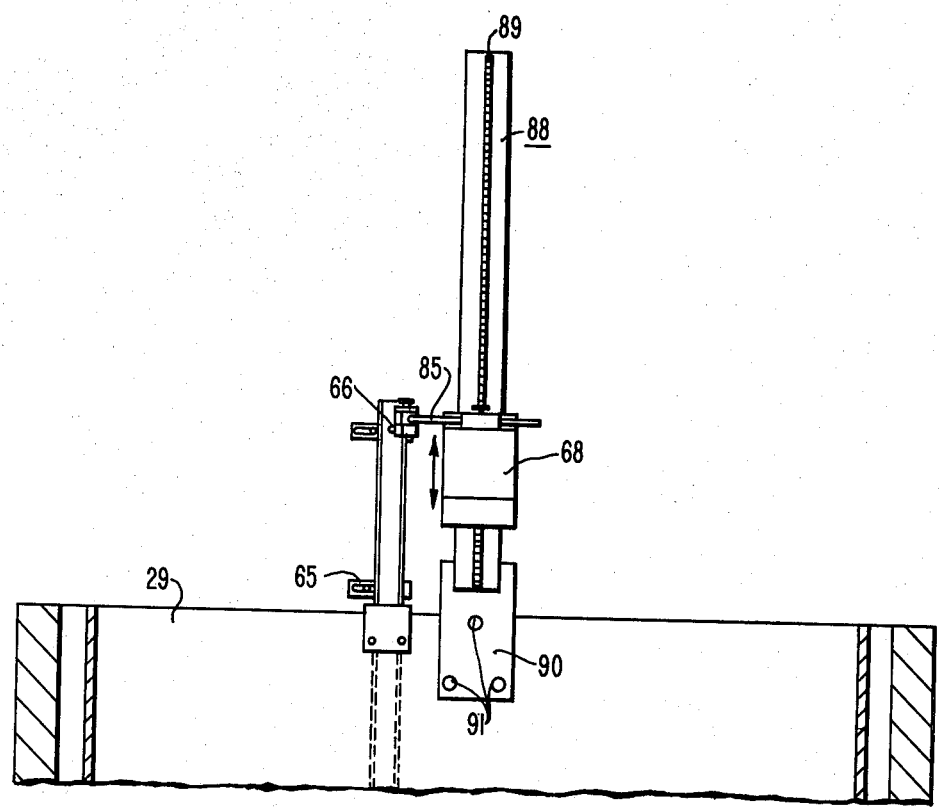
FIG. 6 is a fragmental elevation view of the upper edge of the wrapper of a nuclear steam generator on which the upper end of the cutting apparatus of the present invention is shown installed.
Figure 17:
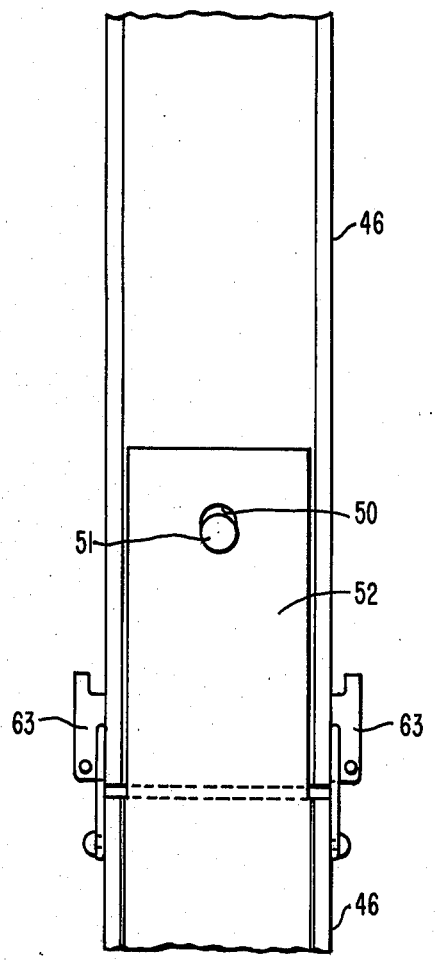
FIG. 17 is an outline elevation view of a preferred construction for interconnecting ends of the torch support column of the present invention including an improved pneumatically operated stabilizer assembly on the lower torch-bearing end of the column.

The support column 39 is made up of a number of aluminum channel sections 46 that are open between projecting webs on one side and closed on the other and which sections provide at their interior a passageway for accommodating extension of the operating gas supply tubes 41 enroute to the cutting torch nozzle 40. In the lowermost one of the support column sections 46 the tube gas supply tubes 41 will be rigid, but above such section extensions of such tubes 41 occur by way of flexible hoses 48, FIGS. 6 and 15, for example. According to a feature of the present invention the column sections can be added one by one to obtain the desired vertical location of the cutting torch with respect to the workpiece parts to be severed and this is enabled by provision of coupling assemblies at the adjacent ends of the column sections. Referring to FIGS. 2, 3 and 4, for example, these coupling assemblies include a plurality of pins that project inwardly at such as the lower end of the column section for insertion into openings 51 in an insertable tab portion 52 extending upwardly from the upper end of an adjacent column section. The pins 50 have neck-down or reduced diameter portions that seat in the bottom of the holes 51 as urged thereto by operation of a clamping mechanism 54 at the lower end of a respective column section and which includes a movable locking finger member 55 that engages a fixed locking finger 56 at the upper end of the insertable tab member 52 attached to the upper end of the adjacent column section 46. The size of the openings 51 relative to the configuration of pins 50 is such that when locked in place the large portions of the pins 50 form annular shoulders that maintain the reduced tab portion 52 seated against the inner widthwise face of the lower end of the adjacent column section. By raising an operating tab 58 and turning a cam (not shown) by a shaft 59 the grip of the movable finger 55 may be relaxed to enable the lower column section 46 to slide under influence of gravity downwardly relative to the upper column section until the pins 50 are centered in the openings 51 to permit separation of the two column sections. Handgrip rings 60 on the ends of removable mounting pins 61 are provided at one side of the column sections in appropriate locations to assist in manipulation of the column sections during assembly and disassembly. In FIG. 17 a preferred single-pin arrangement is shown with toggle type clamping assemblies at opposite side edges of the column sections to give less obstruction to the interior of the channel sections for accommodation of the operating gas supply tubing at the interior of the channel then otherwise may be afforded by the clamping assembly shown in FIGS. 2 to 5.

To provide for manipulation of the cutting torch vertically a pair of toggle clamp assemblies 65 and 66 are provided. The column clamp assembly 65 is mounted directly on the upper end of the wrapper 29, while the column clamp assembly 66 is carried at one end of the adjustable horizontal support arm assembly affiliated with the vertically movable motorized carriage 68. By use of the clamp 66 and operation of the motorized carriage 68 the column 39 can be raised and lowered in the annular space 31 to bring the cutting torch assembly 38 into working positions at different levels within such clearanceway, as well as to provide vertical scanning movement of the cutting torch assembly past the workpiece members during its use at a selected location; a television monitor camera (not shown) being employed to assist in orientation and use of the assembly.

Figure 15:
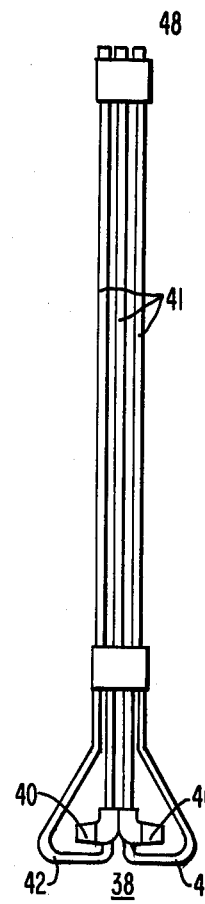
FIGS. 15 and 16 are vertical elevation and bottom views, respectively, of a dual torch assembly for cutting channel-shaped spacer members disposed between the wrapper and shell of a nuclear steam generator.
Figure 16:
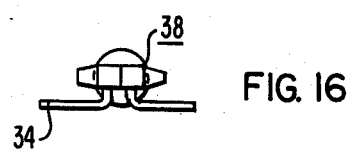

By manipulation of first one and then the other of the column clamp assemblies 65 and 66 column sections 46 can be added to and subtracted from the torch support column 39. By use of a dual torch assembly such as shown in FIGS. 15 and 16 a torch assembly 38 is provided which can be inserted between the webs of a channel-shaped spacer member 34 to effect simultaneous throughcut of such webs.

Figure 13:
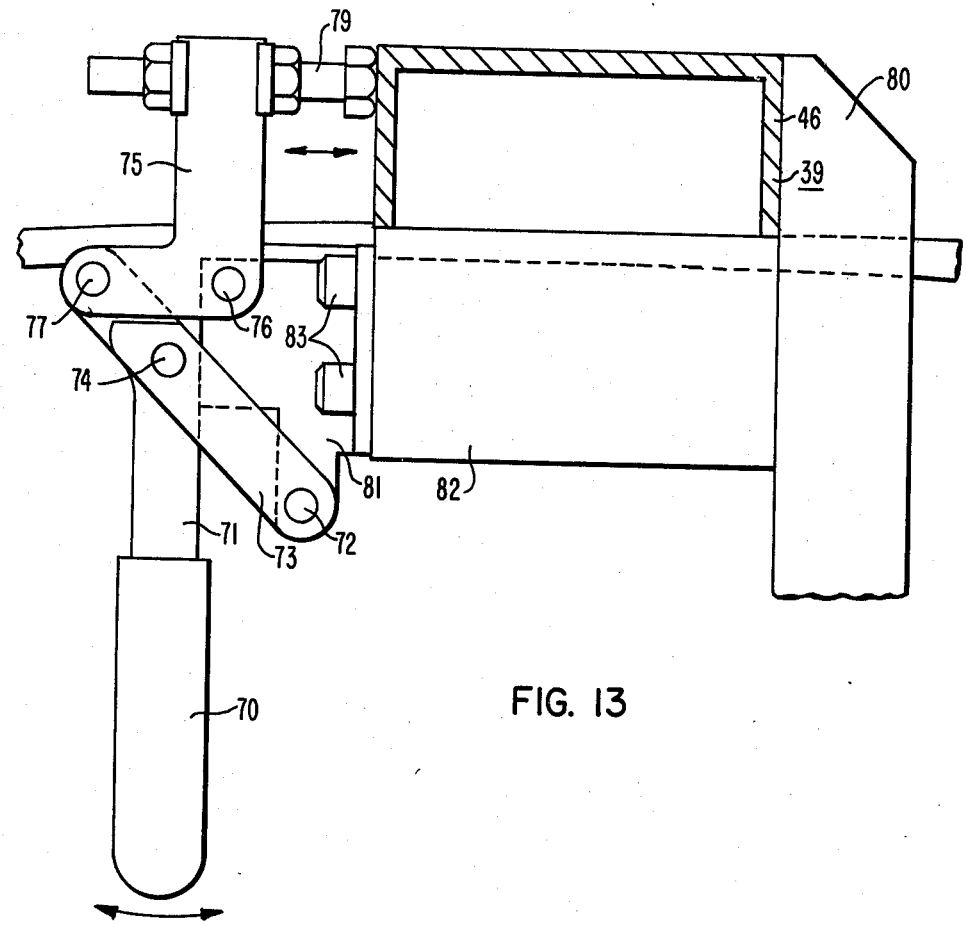
FIG. 13 is a plan view of a toggle clamp assembly utilized in the apparatus of the present invention for holding the torch supporting column of the present invention supported.

A suitable column clamp assembly of a toggle variety is shown in FIG. 13 as including a manually operable handle 70 at the end of an arm 71 that is rockable about a pivot pin 72 by way of a link 73 and a pin 74, to cause a crank arm 75 to pivot about a fixed pin 76 by way of a pin 77 on the arm 71 for actuation of an adjustable movable clamping member 79 toward and away from one edge of the column 39. A rigid backup clamping member 80 for affiliation with the opposite edge of the column is interconnected with the pivot pin 72 and 76 by way of rigid structural members 81 and 82 and securing bolts 83.

The upper column clamp assembly 66 is interconnected with the motorized carriage 68 through the medium of the adjustable arm assembly 85 constructed and arranged to provide horizontal adjusting movement between the carriage 68 and the clamp assembly 66. The motorized carriage 68, the arm assembly 85, and the upper column clamp assembly 66 are supported and guided on a vertically extending rack member 88 that acts to guide and support the vertically movable carriage 68 and includes a rack portion 89, FIG. 6, with which such carriage means cooperates to obtain vertical movement and positioning. A suitable carriage for this purpose may be such as that provided by Union Carbide Welding Products and sold as an All-Position Travel Carriage No. CM-77 that is self-propelled, reversible, of variable speed, driven by way of rack and pinion, etc.

The rack and guide member 88 on which the motorized carriage 68 travels is supported by a bracket assembly 90 removably clamped by such as turn screws 91 to the upper edge of the wrapper 29.

The cutting torch apparatus of the present invention may be moved to different circumferential sites around the upper edge of the wrapper as required, by relaxation of the clamp assemblies affiliated with the column 88 and the support clamp 65.

Figures 10, 11, 12:
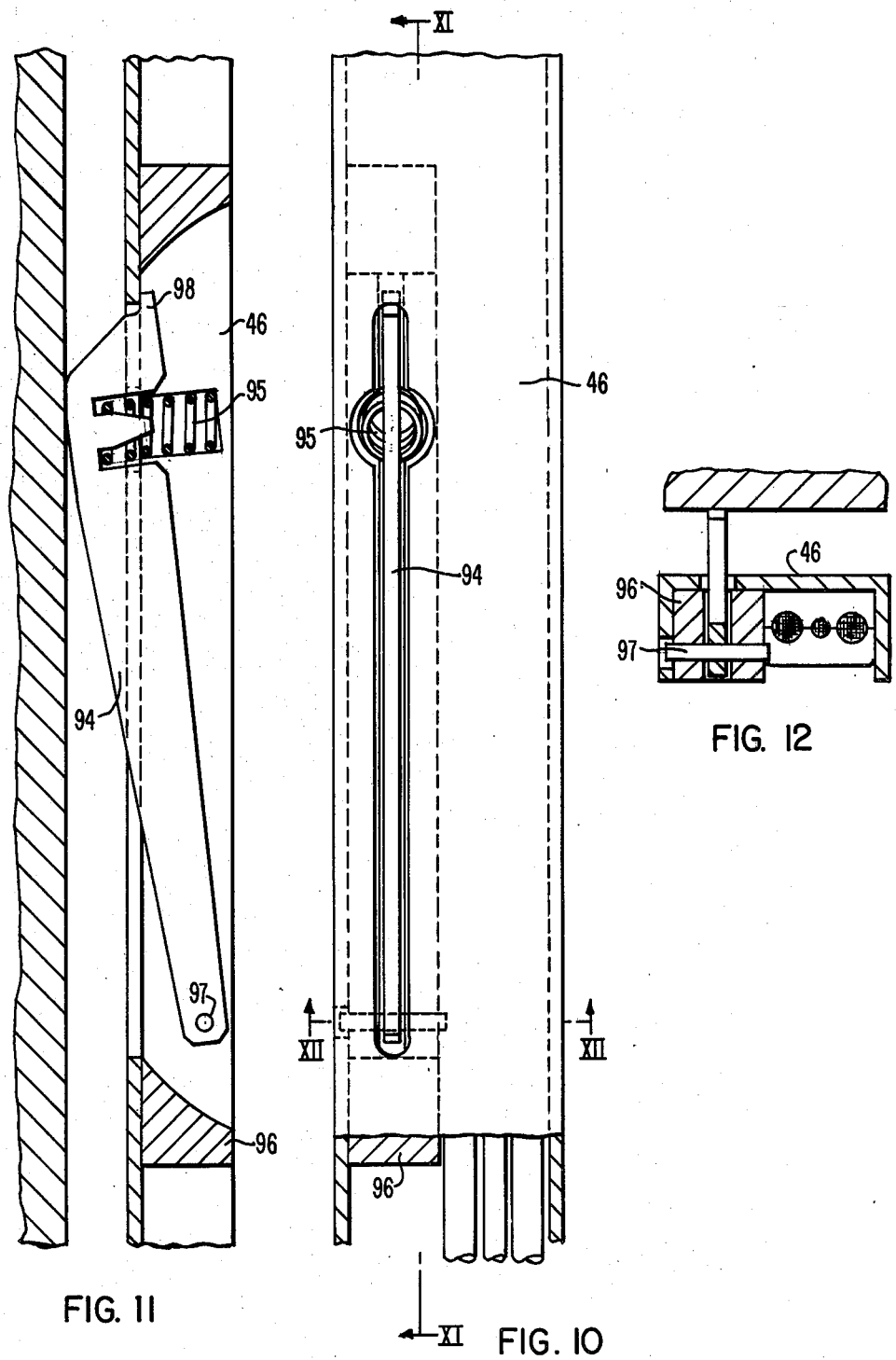
FIG. 10 is a front elevation view showing in outline a spring-biased spacer member affiliated with a portion of the torch supporting column in the apparatus of the present invention.
FIG. 11 is a view taken along the line XI—XI in FIG. 10.
FIG. 12 is a section view taken along the line XII—XII in FIG. 10.

To assist in proper radialwise location of the column 39 when disposed within the annular clearanceway 31 between the wrapper 29 and the shell 3 spring-biased expandable slide members 94 may be provided on one or more of the column sections 46 which slidably cooperate with the inner wall of the shell 3 and urge the column 39 toward the outer surface of the wrapper 29 such that its otherwise open end between the webs thereof slidably engage such outer wrapper surface. As is shown in FIGS. 10, 11 and 12 the member 94 can be biased by a helical spring 95 suitably arranged in a socket portion of a member 96 attached to the column section 46. A pin 97 at one end of the member 94 pivotally connects such one end to the member 96. Yieldable movement as may be required about the pin 97 can occur against opposition of spring 95 at the opposite end of such member 94. A stop finger 98 is formed in the adjacent portion of member 94 to prevent escape of such member 94 under influence of bias spring 95.

Other arrangements may be equally effective or preferred. For example, a pneumatically operable position biasing assembly 100, FIG. 17, may be substituted for the spring-biased guide member 94. Assembly 100 may be operated selectively, for example, brought into play only after the cutting torch has arrived at a selected vertical work site and, by slidable engagement with the inner wall of the shell 3 act to provide freedom for vertical movement of the column and torch assembly while opposing the sidewise movement of such assembly during operation of the cutting torch.

Having now described the invention, what is claimed as new is:

1. Apparatus for cutting spacer and support members extending at distributed locations between the tube-bundle-encircling wrapper and the outer shell of a vertically-extending nuclear steam generator with top removed, comprising:
    a cutting torch disposed in an annulus between said wrapper and said shell for cutting through said spacer and support members,
    a vertical support column extending downwardly in said annulus in support of said torch at its lower end,
    said support column including a plurality of longitudinal separably-interconnected sections,
    an elongated guide member extending above the upper edge of said wrapper and including a rack extending along the length thereof,
    vertically movable motorized carriage means on said guide member in motion-driving position-securing cooperation with said rack,
    horizontally adjustable arm means carried by said carriage means,
    column-supportable releasable clamp means on said arm for clamped support of said column, and,
    conduit means extending along said column for conveying operating gas to said cutting torch.

2. The apparatus as set forth in claim 1, wherein said support column is of U-shaped transverse cross section and said conduit means extends between side webs thereof.

3. The apparatus of claim 1, further comprising a column-supportable releasable clamp means releasably affixed to the upper portion of said wrapper for alternative support of said column.

4. The apparatus of claim 1, wherein separable interconnection between column sections is afforded by inclusion of locating pin-and-hole means and toggle clamp means cooperable between adjacent column section ends.

5. The apparatus of claim 1, further including bias means urging said column toward said wrapper.

6. The apparatus of claim 2, further including bias means urging said column toward said wrapper.

7. Apparatus for cutting spacer and support members extending at distributed locations between the tube-bundle-encircling wrapper and the outer shell of a vertically-extending nuclear steam generator comprising:
    a cutting torch sized to be disposed in an annulus between said wrapper and said shell for cutting through said spacer and support members, a vertical support column arranged to extend downwardly in said annulus in support of said torch at its lower end, said support column including a plurality of longitudinal separably-interconnected sections, an elongated guide member supported to extend above the upper edge of said wrapper and including a rack extending along the length thereof, vertically movable carriage means on said guide member in motion-driving position-securing cooperation with said rack, said vertically movable carriage means adapted to carry and support said vertical support column, and conduit means extending along said support column for conveying operating gas to said cutting torch.

8. The apparatus of claim 7 including:

horizontally adjustable arm means carried by said carriage means, and column-supportable releasable clamp means on said arm for clamped support of said column.

* * * * *